United States Patent [19]

Handa et al.

[11] Patent Number: 4,623,173

[45] Date of Patent: Nov. 18, 1986

[54] SCREW JOINT COUPLING FOR OIL PIPES

[75] Inventors: Masao Handa; Mikio Ueki; Tomohiko Tokuya, all of Yokohama; Mitsuaki Hori, Kamakura; Hidenori Yasuoka, Kawasaki; Toshio Sato; Takuzo Ichihara, both of Tokyo; Kenichi Toyama, Yokohama, all of Japan

[73] Assignee: Nippon Kokan Kabushiki Kaisha, Tokyo, Japan

[21] Appl. No.: 647,677

[22] Filed: Sep. 5, 1984

[30] Foreign Application Priority Data

Jun. 20, 1984 [JP] Japan .............................. 59-125346

[51] Int. Cl.[4] ............................................ F16L 15/00

[52] U.S. Cl. ................................... 285/333; 285/334; 285/334.2; 285/334.4; 285/370

[58] Field of Search .................... 285/333, 334, 334.2, 285/334.4, 390

[56] References Cited

U.S. PATENT DOCUMENTS

| | | | |
|---|---|---|---|
| 2,051,499 | 8/1936 | Siegle | 285/333 |
| 3,870,351 | 3/1975 | Matsuki | 285/334 |
| 4,009,893 | 3/1977 | Schatton et al. | 285/334 |
| 4,153,283 | 5/1979 | Hellmund et al. | 285/334 |

FOREIGN PATENT DOCUMENTS

| | | | |
|---|---|---|---|
| 1243605 | 7/1967 | Fed. Rep. of Germany | 285/333 |
| 2134274 | 8/1972 | Fed. Rep. of Germany | 285/334 |
| 2438387 | 2/1976 | Fed. Rep. of Germany | 285/333 |
| 1564218 | 4/1969 | France | 285/334 |
| 663403 | 5/1964 | Italy | 285/334 |
| 7510249 | 3/1977 | Netherlands | 285/334 |

*Primary Examiner*—Cornelius J. Husar
*Assistant Examiner*—Eric K. Nicholson
*Attorney, Agent, or Firm*—Frishauf, Holtz, Goodman & Woodward

[57] ABSTRACT

A basic structure of a screw joint coupling for oil pipes according to the invention is that a main sealing portion is constructed with a sealing portion formed axially in convex at an end of a male screw, and with a sealing portion formed in taper at an inner side of a female screw, and that the male screw and the female screw are butted at an end point of the former and an end part of a stopper formed at an inner side of the latter. The main sealing portion has a shrinkage allowance $\Delta D$ of the seal part, which is regulated in size in a relation between a shrinkage allowance $\Delta d$ of the screw and a pressure P of the sealing part. In addition, specific values are selected as to the load flank angle, the radius of curvature in convex of the sealing portion of the male screw, and the tapering angle of the sealing portion of the female screw.

6 Claims, 3 Drawing Figures

B
2
S (Contacting center)
4
θ
A1
d1
d2
1
D1
3
51
D2
5

SCREW JOINT COUPLING FOR OIL PIPES

BACKGROUND OF THE INVENTION

This invention relates to a screw joint coupling for oil pipes.

Since the screw joint coupling for oil pipes is used under high pressure, high load and other severe conditions, many studies have been made of various kinds of coupling structures.

Known screw couplings are so-called metal sealing system. The metal seal is prepared with a sealing portion shaped in taper at the end point of a metal screw (smooth outer circumferential part) and a sealing portion shaped in taper at an inner part of a female screw (smooth inner circumferential part), and provided by butting the end point of the male screw and the end point of a stopper formed at an inner side of the female screw; or said sealing part of the male screw is formed in convex in an axial direction.

This kind of coupling does not always provide an adequate air-tightness, so that it can cause stress corrosion cracking. Moreover, with respect to the structure of this coupling, in order to improve the sealing property a determined inclining angle is given to the end point of the male screw and that of the stopper, to thereby force up the male screw so that the sealing portion of the male screw is urged toward the female screw. But because very strong force is exerted on the stopper, bending moment or wedging effect are applied to the root of the stopper, and this portion is consequently affected by stress corrosion.

The present inventon has been developed in view of the above mentioned problems encountered by the prior art.

It is an object of the invention to provide a structure of a joint coupling for oil pipes which has excellent strength and sealing properties without bringing about problems such as stress corrosion cracking.

It is another object of the invention to provide a structure of a joint coupling for oil pipes which has an excellent sealing property without designing an inclining angle in the end point of the male screw and the end part of a stoper formed at the inner part of the joint coupling, whereby the stress corrosion to be caused by said inclining angle is thereby avoided.

It is a further object of the invention to provide a structure of a joint coupling for oil pipes which maintains a high quality sealing property in spite of repeated of screwings and unscrewings of the coupling.

BRIEF DESCRIPTION OF THE INVENTION

For accomplishing the above mentioned objects, the invention adopts such a structure for a joint coupling where a main sealing portion is provided with a sealing portion (outer circumference) which is formed axially in convex at an end of the male screw, and with a sealing portion (inner circumference) which is formed in taper at an inner side of a female screw, and provided by butting the end point of the male screw and the end part of the stopper formed at the inner part of the female screw; and comprising parts of the joint coupling constructed under the following conditions (i) a screw portion is provided with a shrinkage allowance $\Delta d$ ($=d1-d2$), and a load flank angle ($\alpha$) of the screw portion is selected to be 0 to 1.1°;

(ii) a convex (arc face) in an axial direction of the sealing portion of the male screw is formed with a radius of curvature of more than 100 mm, and the tapering angle ($\theta$) of the sealing portion of the female screw is 1.0 to 4.7°, preferably 1.0 to 2.0°;

(iii) an outer diameter D1 of the sealing portion of the male screw and an inner diameter D2 of the sealing portion of the female screw are made $D1>D2$, and a shrinkage allowance $\Delta D$ ($=D1-D2$) of the seal part is provided where the sealing shrinkage allowance is formed such that pressure P of the sealing part is (inner pressure applied to the screw coupling)$<P<$(yield strength of composing member of the screw joint coupling); and (iv) relation between the seal shrinking margin $\Delta D$ and the screw shrinking margin $\Delta d$ is set $\Delta D \geqq \Delta d$.

Thus, the structure of this invention is respectively formed with the main sealing portion having a seal shrinkage allowance $\Delta D$, the screw having a shrinkage allowance $\Delta d$, and the butting end point of the male screw—the end point of the stopper without using an inclined angle. Due to the selection of the tapering angle $\theta$ and the convex curvature of the screw at the main sealing, portion the selection of the relationship between the seal shrinking margin $\Delta D$ and the pressure P of the sealing face, and the selection of the relationship between the seal shrinkage allowance $\Delta D$ and the screw shrinking margin $\Delta d$, the main sealing portion is imparted with the sealing property of high degree, and is effectively maintained in spite of repeated of screwings and unscrewings of the coupling. Further, due to the selection of the load flank angle of the screw, occurrence of stress in the circumference of the coupling which causes stress corrosion cracking is substantially avoided. Since said avoidance and high sealing property are achieved, it is not necessary to form the inclined angle in the end point of the male screw and the end point of the stopper as shown in the prior art. Therefore, the stress corrosion problem due to the inclining is effectively eliminated angle.

The coupling structure according to the invention may be applied to the situation of using the coupling member of the sleeve of directly connecting one oil pipe to another oil pipe.

DETAILED DESCRIPTION OF THE PREFERRED EMBODIMENT

A detailed description will be made with respect to the attached drawing.

Figure 3:
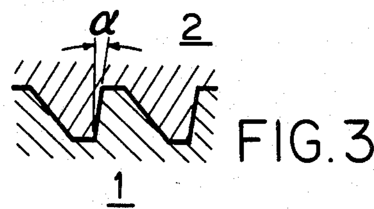
FIG. 3 is an enlarged view of the portion in FIG. 1 denoted by 20.
Figure 1:
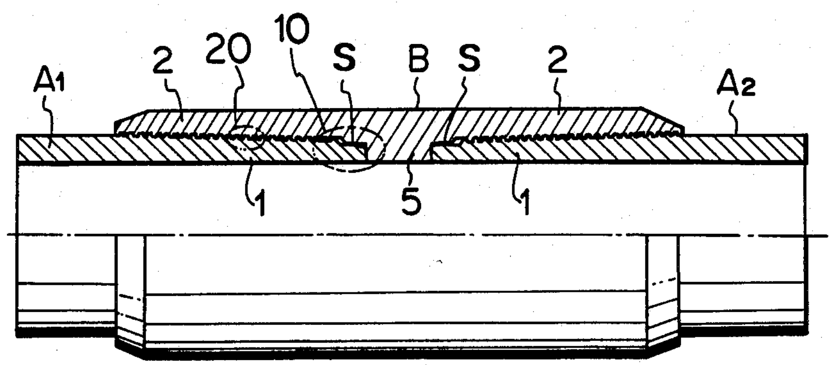
FIG. 1 is an explanatory view showing a joint coupling structure of the invention.
Figure 2:
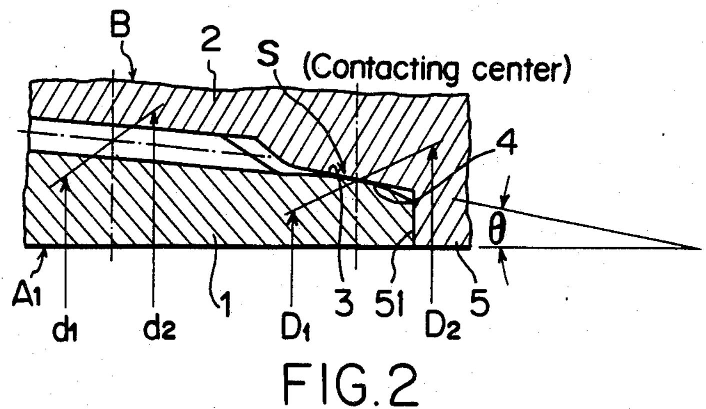
FIG. 2 is an enlarged view of the portion in FIG. 1 denoted by 20.

FIG. 1 shows an example of a coupling structure of the invention by means of a joint coupling member B (sleeve coupling). The joint coupling member B is defined at its both sides with female screws 2, 2 to which pipe bodies A1, A2 (oil pipes) are connected with male screws 1 defined at their end portions.

In each of the coupling structures of the joint coupling member B, the male screw portion 1 has a smooth face at an end point of an outer circumference, which is formed in convex, and a sealing portion 3 is formed at one side. The female screw portion 2 has a smooth inner circumference, which is formed in taper, and a sealing portion 4 is formed at the other side. Both of these sealing portions 3 and 4 form a main sealing portion S. On the other hand, the sealing portion 4 has a stopper 5 with an end 51 to which an end of the male screw is brought into contact.

In the above mentioned structure, the present invention specifies the structues of the screws, the structure of the main sealing S and the mutual relation therebetween.

In order to also provide a seal on the screw portion of the screw and coupling, a relation is specified of (basic diameter d1 of the male screw)>(basic diameter d2 of the female screw), thereby to prepare a shrinkage allowance $\Delta d$ ($=d1-d2$) of the screw, and the screw is provided with load flank angle a between 0° and 1.1°. If the load flank angle a were large, a large coupling stress would be caused in the circumferential direction when the screw is tightened or the tension load is affected, and this would cause stress corrosion cracking.

According to the inventors' experiments, it has been made clear that when the tension is exerted axially and if the friction coefficient in the screw portion exceeds 0.02, excessive stress is effected circumferentially. Therefore, in order that the friction coefficient is not more than 0.02 the load flank angle should not exceed 1.1° in the upper limit, and set within a range of between 0° and 1.1°.

In the main sealing portion S, a relation of "D1>D2" is made with respect to the outer diameter D1 (outer diameter at the center of the sealing portion) of the sealing 3 of the convex surface formed in the male screw 1 and the inner diameter D2 (inner diameter at the center of the sealing portion) of the sealing 4 of the taper formed in the female screw 2. The male screw portion is provided with a shrinkage allowance $\Delta D$ of the sealing portion which is formed such that pressure P to be applied by the shrinkage allowance $\Delta D$ in the sealing face is satisfied where under conditions where P<(yield strength of the screw coupling material)

P>(pressure applied to the inner part of the screw coupling material).

Since the joint coupling for the oil pipe is subjected to repeated screwings and unscrewings, the sealing ability should be always kept without changes in the pressure of the sealing face to repetition of said screwings-unscrewings. Therefore the pressure P of the sealing face should be made less than yield strength of the pipe body A and that of the joint coupling member B. The sealing face is formed by machining, and it is not perfectly smooth in micro-view but uneven. For maintaining an air tightening, the pressure P of the sealing face should be higher than fluid pressure applied to the inside of the screw coupling. In the invention, the shrinkage allowance $\Delta D$ of the sealing portion is specified for providing such pressure of the sealing part to satisfy the above two conditions.

With respect to the structures for forming the main sealing portion S, the sealing portion 4 of the female screw is formed at tapering angle of 1.0° to 4.7°. The oil pipe is affected with not only the inner pressure but also strong tension due to the own weight of the pipe per se. The tension sometimes increases to an extent equal to the yield strength of the pipe body. According to the inventors' studies, it has been found that when the tension is added to the pipe body, elongation is generated in the sealing portion 4 of the female screw, and discrepancy in position is caused between the sealing position 3 of the male screw and the sealing position 4 of the female screw, so that the pressure of the sealing face is lowered. In order to maintain the proper pressure P of the contacting surface, the smaller the taper angle $\theta$ of the sealing portion 4 of the female screw, the more effective is the sealing. Various experiments have confirmed that if the taper angle is less than 4.7°, the sealing is effective, and if it is less than 2.0°, the sealing is more effective. For making this portion an effective seal a tapering angle $\theta$ greater than certain number of degrees is necessary, and the lower limit thereof is 1.0°. If the pressure is applied to the inside of the joint coupling by making the tapering angle $\theta$ small, the male screwing seal is forced up, so that the pressure at the contacting face of the sealing portion is increased (self-sealing effect), and the air-tightness is further heightened.

With respect to the sealing portion 3 of the male screw, the convex surface is axially made at radius of curvature (R) of more than 100 mm. If the seal shrinkage allowance $\Delta D$ is determined to be constant, the smaller the radius of curvature (R) of the convex surface to form the sealing, portion S the smaller is the contacting face of the seal. It would seem that since the pressure of the contacting face is increased, the air-tightness is heightened. However, the inventors' investigations have made it clear that when the pressure is applied to the inside of the joint coupling, the pressure of the contacting face is abruptly increased due to the self-sealing effect, so that the sealing portion is easily deformed. Therefore, in the invention, the radius of curvature R shaped in convex of the sealing portion 3 is made larger than a determined length in order to more effectively maintain a contacting area of the seal. In the inventors' experiments, when the radius of curvature R was more than 100 mm, results were almost satisfied, and when the pipe had an outer diameter between 60.3$\phi$ and 114.3 $\phi$mm, the optimum radius of curvature R was 150 to 250 mm. Under these circumstances, according to the invention, the convex of the sealing portion 3 is formed with a radius of curvature of more than 100 mm.

In addition to each of the structural details of the above mentioned screws and main sealing portion, the present invention provides for a mutual relation between seals to be formed on the male and female parts. That is, with respect to the seal shrinkage allowance $\Delta D$ of the main sealing portion S and the screw shrinkage allowance $\Delta d$ of the screw portion, the relation of both is made $\Delta D \geqq \Delta d$. If the screw shrinkage allowance $\Delta d$ were larger than the seal shrinkage allowance $\Delta D$, the pressure P of the sealing face would be reduced below a designated value due to interference of the screw portion. The conventional joint coupling has never had any structure where a structural consideration is made to the sealing portions and the screwing portions. The sealing effect is not always satisfied in the main sealing portion, and this fact is considered to be due to said interference of the screw portion. This invention has paid attention to the structural elements which conventionally have not been taken into consideration.

FIG. 1 illustrates the female screw coupling member B. The above mentioned structure may be of course applied to a joint coupling where the pipes are directly connected at their ends without using a coupling member.

In the screw coupling for the oil pipes according to the invention, the air-tightness is maintained by means of the main sealing portion S formed with the shrinkage allowance $\Delta D$ in the sealing portions 3, 4, the sealing portion formed with the screw shrinking allowance Δd, and the sealing portion formed by butting between the end point of the male screw and the end part of the stopper. in such an air tight structure the invention selects a certain tapering angle θ of the sealing portion 4 of the female screw, the radius of curvature in convex of the sealing portion 3 of the male screw, the seal shrinkage allowance ΔD in the relationship between the pressure P of the sealing face and the inner pressure applied to the yield strength of the constructing material and the screw coupling. Further, since it regulates the seal shrinkage allowance ΔD and the screw shrinkage allowance Δd in the relation of ΔD≧Δd, the high sealing property may be provided in the main sealing portion S, and the structure may be used in spite of repeated screwings and unscrewings without changing the sealing property. Also, the joint coupling of the invention selects the load flank angle a of the screw portion, thereby to appropriately check occurrence of stress in the circumference of the coupling, which causes stress corrosion cracking. In addition to this checking, it is no longer necessary to prepare the inclining angle as conventionally at the end of the male screw 1 and the end of the stopper 5, because of providing the high sealing property. Since the angles of these ends may be made 90°, the stress corrosion may be exactly avoided which is effected by working due to said inclining angle.

What is claimed is:

1. A screw joint coupling for oil pipes, wherein a main sealing portion is provided with a sealing portion which is axially convex at an end of a male screw, and with a sealing portion which is tapered at an inner side of a female screw, and an end point of the male screw butting an end part of a stopper formed at the inner side of the female screw, and composing parts of the joint coupling being constructed under the following conditions:

(i) a screw portion is provided with a shrinkage allowance Δd, and a load flank angle of the scew portion is between 0° to 1.1°;

(ii) a convex surface in an axial direction of the sealing portion of the male screw is formed with a radius of curvature of more than 100 mm, and a tapering angle of the sealing portion of the female screw is between 1.0° to 4.7°;

(iii) an outer diameter D1 of the sealing portion of the male screw and an inner diameter D2 of the sealing portion of the female screw are made so that D1>D2, to which a shrinkage allowance ΔD of the sealing portion is formed such that pressure P of the sealing part is (inner pressure applied to the screw joint coupling)<P<(yield strength of the sealing portion of the screw joint coupling); and (iv) the relation between the seal shrinkage allowance ΔD and the screw shrinkage allowace Δd is set ΔD≧Δd.

2. A screw joint coupling for oil pipes as claimed in claim 1, wherein the male screw portion is formed at an end of one oil pipe, and a female screw is formed at an end of the other oil pipe.

3. A screw joint coupling for oil pipes as claimed in claim 1, wherein the male screw portion is formed at an end of one oil pipe, and a female screw portion is formed at an end of a coupling member shaped in sleeve.

4. A screw joint coupling for oil pipes as claimed in any one of claims 1 to 3, wherein a tapering angle θ of a sealing portion of the female screw is 1.0° to 2.0°.

5. A screw joint coupling for oil pipes as claimed in any one of claims 1 to 3, wherein an oil pipe of an outer diameter of 60.3 mm to 114.3 mm has a radius of curvature between 150 mm and 250 mm in convex surface in an axial direction of the sealing portion of the male screw.

6. A screw joint coupling for oil pipes as claimed in claim 4, wherein an oil pipe of an outer diameter of 60.3 mm to 114.3 mm has a radius of curvature between 150 mm and 250 mmm in convex surface in an axial direction of the sealing portion of the male screw.

* * * * *

UNITED STATES PATENT AND TRADEMARK OFFICE

CERTIFICATE OF CORRECTION

PATENT NO. : 4,623,173

DATED : November 18, 1986

INVENTOR(S) : Masao HANDA et al

It is certified that error appears in the above-identified patent and that said Letters Patent is hereby corrected as shown below:

COLUMN 1, line 29, delete "But"; "because" should read --Because-

COLUMN 1, line 50, before "screwings", delete "of";

COLUMN 1, line 44, "stoper" should read --stopper--;

COLUMN 2, line 8, after "allowance", insert --ΔD--;

COLUMN 2, line 22, after "sealing", delete ",";
after "portion", insert -- , --;

COLUMN 2, line 28, after "repeated", delete "of";

COLUMN 2, line 37, after "inclining", insert --angle--;
line 38, after "eliminated", delete "angle";

COLUMN 3, line 38, after "satisfied", delete "where";

COLUMN 3, line 46, after "Therefore", insert -- , --;

COLUMN 4, line 21, ",portion S" should read --portions,--;

COLUMN 5, line 12, "it regulates" should read --the invention selects--.

Signed and Sealed this

Eighth Day of December, 1987

*Attest:*

DONALD J. QUIGG

*Attesting Officer* *Commissioner of Patents and Trademarks*